United States Patent [19]

McIlvride

[11] Patent Number: 4,655,284

[45] Date of Patent: Apr. 7, 1987

[54] WELL HEAD SHUT-OFF DEVICE

[75] Inventor: Garry McIlvride, Edmonton, Canada

[73] Assignee: Positive Action Tool Western Limited, Calgary, Canada

[21] Appl. No.: 828,250

[22] Filed: Feb. 11, 1986

[51] Int. Cl.⁴ ............................................. E21B 33/06
[52] U.S. Cl. ........................................ 166/84; 166/88; 277/111
[58] Field of Search .................. 166/80, 84, 87, 88; 277/107, 110, 111, 112, 113, 116.2

[56] References Cited

U.S. PATENT DOCUMENTS

| | | | |
|---|---|---|---|
| 1,844,409 | 2/1932 | Rypinski | 277/112 |
| 1,902,097 | 3/1933 | Penick et al. | 286/16.2 |
| 2,670,689 | 9/1952 | Eckel | 166/14 |
| 2,780,233 | 2/1957 | Volpin | 137/315 |
| 4,071,085 | 1/1978 | Grable et al. | 166/84 |
| 4,289,294 | 9/1981 | McLean | 166/84 |
| 4,384,726 | 5/1983 | Meyer | 277/112 |
| 4,386,783 | 6/1983 | Davis | 277/111 |
| 4,522,368 | 6/1985 | Sable | 166/84 |

OTHER PUBLICATIONS

Sketch A.
Double-E Blowout Preventer Brochure, pp. 15 and 16.
Guiberson Dresser Blowout Preventers Brochure, 2610–16.

*Primary Examiner*—James A. Leppink
*Assistant Examiner*—Terry Lee Melius
*Attorney, Agent, or Firm*—Ridout & Maybee

[57] ABSTRACT

Well head shut-off device having a housing with a bore for connection to the upper end of production tubing, upper and lower shoulders in the bore and an annular pack-off element with an internal tapering expansion member driveable reciprocably between the shoulders whereby compression of the pack-off element against the shoulders expands the element tightly between the bore and a cylindrical shaft passing through the middle of the pack-off element, whereby a pack-off can be achieved at upper or at lower positions. This allows rapid pack-off to be achieved regardless of the direction in which the pack-off member is driven.

18 Claims, 7 Drawing Figures

WELL HEAD SHUT-OFF DEVICE

The present invention relates to well head shut-off devices which can be employed for forming a seal in the annular space between a cylindrical housing forming part of the well head structure and a polished rod or other cylindrical shaft, passing through said housing. More especially, the invention relates to devices for use in the high pressure and high temperature steaming of relatively intractable underground deposits of heavy hydrocarbons in order to render the hydrocarbons liquid to allow recovery. Such steaming is usually conducted using a well having a string of production tubing extending downwardly into the earth co-axially centrally of an outer tubular casing which thus defines an annulus around the production tubing. High pressure steam is injected down the annulus and liquid heavy hydrocarbon is produced up the production tubing. With this operation there is risk of rupture of stuffing boxes or other equipment connected to the production tubing during steam injection or subsequently. Such rupture can result in escape of high temperature and high pressure steam, hot liquid hydrocarbon, and other liquids or gases such as liquid hydrocarbons, water and well gases. Escape of hot fluids represents at least an economic loss of the heat energy employed in the steam generation. Escapes of other liquids or gases may be undesirable environmentally. For example, some escaping gases may contain $H_2S$ or other toxic gases. Further, in some cases, the escape of steam, gas or liquid, if allowed to proceed unchecked, can lead to damage to well head gear, possible injury to personnel, and blow out of the well, resulting in upward ejection of the production tubing string and wrecking of the well. There have been various proposals for vapor shut-off devices for packing off a zone of the well head equipment upwardly from the upper end of the production tubing string, in order to interrupt escape of steam or other high temperature vapor, but these have not been as effective or as readily operable as desirable.

The present invention provides a well head vapor shut-off device, comprising:

(a) a housing adapted to be connected to the upper end of production tubing and having a vertical bore therethrough, a flow conduit communicating with the interior of the bore for collection of liquid flowing into the bore from the production tubing, and a shoulder extending laterally inwardly of the bore at upper and lower portions thereof;

(b) a pack-off member disposed in the bore and comprising a heat resistant resiliently deformable annular sealing element of which the middle opening extends vertically of the bore and is adapted to receive a cylindrical shaft therethrough, and the periphery conforms to the interior of the bore, a rigid face plate on the upper and lower sides of the sealing element, and a rigid expansion member tapering from adjacent one of said face plates vertically toward the interior of the sealing element and being received in a corresponding cavity therein;

(c) an operator member slidable vertically relative to said pack-off member and face plates and having upper and lower abutments facing toward the face plates on the upper and lower sides of the sealing element, respectively; and (d) means for reciprocating said operator member between an upper position engaging the upper face plate on the upper shoulder and compressing the sealing element between the upper face plate and the lower face plate retained on the lower abutment, and a lower position engaging the lower face plate on the lower shoulder and compressing the sealing element between the lower face plate and the upper face plate retained on the upper abutment, whereby in each of said positions the sealing element is compressed vertically and the expansion member is driven vertically inwardly relative to said cavity, thereby expanding the sealing element laterally to form a seal between the bore and the cylindrical shaft when inserted therein.

In one advantageous application of the present device, the upper end of the housing includes a gland or stuffing box forming a seal with a polished rod passing through the middle opening of the sealing element of the pack-off member. Often, in steam injection operations, a sucker rod string is employed which passes downwardly through the production tubing and is connected to a down hole pump for pumping hydrocarbon up the production tubing and out of the flow conduit. The sucker rod string is connected to a polished rod passing through a stuffing box connected to the production tubing. However, the stuffing box has to be formed with relatively soft sealing material in order to avoid excessive frictional losses and wear of the polished rod over pumping periods which may continue for several months. The stuffing box sealing materials are therefore vulnerable to damage by exposure to the high temperature vapors and hydrocarbon products and are therefore prone to failure leading to vapor escape therethrough. One advantage of the present arrangement, especially when, as is usual, the shut-off device is manually operated, is that regardless of the direction in which the operator member is reciprocated, packing-off and sealing can be achieved, since a seal will be achieved at either of the above-mentioned upper and lower positions. This is advantageous since, frequently, steam escapes are observed by, and need to be dealt with by, well attendants who are not always completely familiar with all the various modes of operation of different varieties of well head equipment. Thus valuable time can be saved in shutting off an escape of steam from the stuffing box.

The arrangement of the invention has the further advantage that the pack-off member carries with it its own built-in tapering expansion member which moves upwardly and downwardly with the sealing element, so that the pack-off member does not rely for sealing purposes on alignment with a tapering internal surface of the bore. Such tapering internal surfaces would render the construction of the device considerably more complex where, as in the present device, seals are formed alternatively at upper and lower positions.

In a further advantageous application, the flow conduit connects with a part of the bore intermediate the upper and lower portions housing the said shoulders, so that in the lower pack-off position a seal is formed preventing flow from the production tubing to the flow conduit. With this arrangement, in the upper pack-off position a seal can be formed preventing steam escape from a gland, if a polished rod is employed, and, in the lower pack-off position, the flow conduit is shut off, preventing steam or other vapor escape or liquid escape in the event of rupture of the lines connected to flow conduit or failure of the valves or other equipment associated with the production flow lines.

An example of a preferred form of a shut-off device in accordance with the invention will now be described, by way of example only, with reference to the accompanying drawings, in which.

Figure 1:
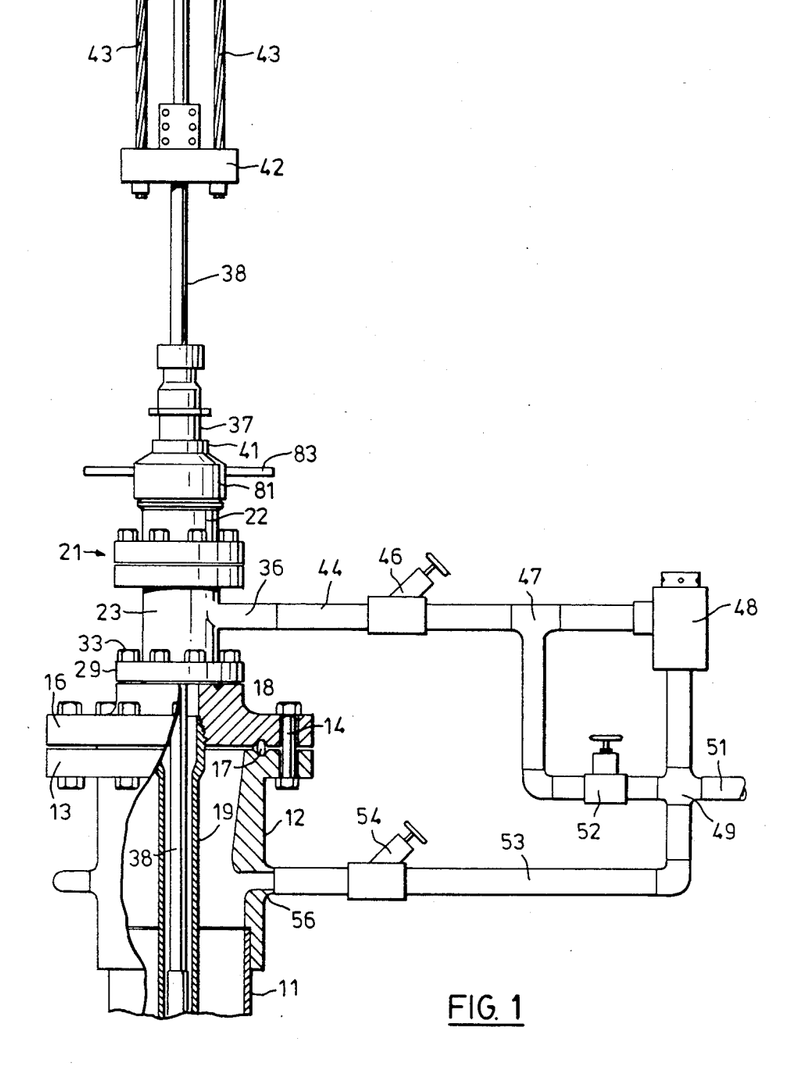
FIG. 1 shows, partially schematically and partially in section, well head equipment including a vapor shut off device in accordance with the invention.

FIG. 1 shows a typical well head configuration, showing a tubular outer casing 11, the upper end of which is connected to an inwardly downwardly tapering cylindrical bowl 12, having a circular upper flange 13. On the flange 13 and secured by bolts 14 is an adapter or hanger flange 16. The mating surfaces of flanges 16 and 13 provide cooperating annular channels trapping a steel ring gasket 17. The central opening 18 of flange 16 has a threaded downwardly flaring lower portion. Into this is threaded the upper end of a string of production tubing 19. The tubing 19 is thereby held hanging or suspended down the well from the flange 16. A vapor shut-off device 21 in accordance with the invention is connected on the flange 16. As seen in more detail in FIG. 2, this comprises a tubular housing comprising upper and lower tubular members 22 and 23, with cooperating flanges 24 and 26 trapping a steel ring gasket 27 and secured together by threaded studs 28 and nuts 28a. Likewise, the lower end of lower member 23 has an annular flange 29 formed with a sealing ring channel 31 and through-holes 32 for sealing attachment of the device to the flange 16 using studs and nuts 33, seen in FIG. 1, going into blind holes in the flange 16.

Figure 2:
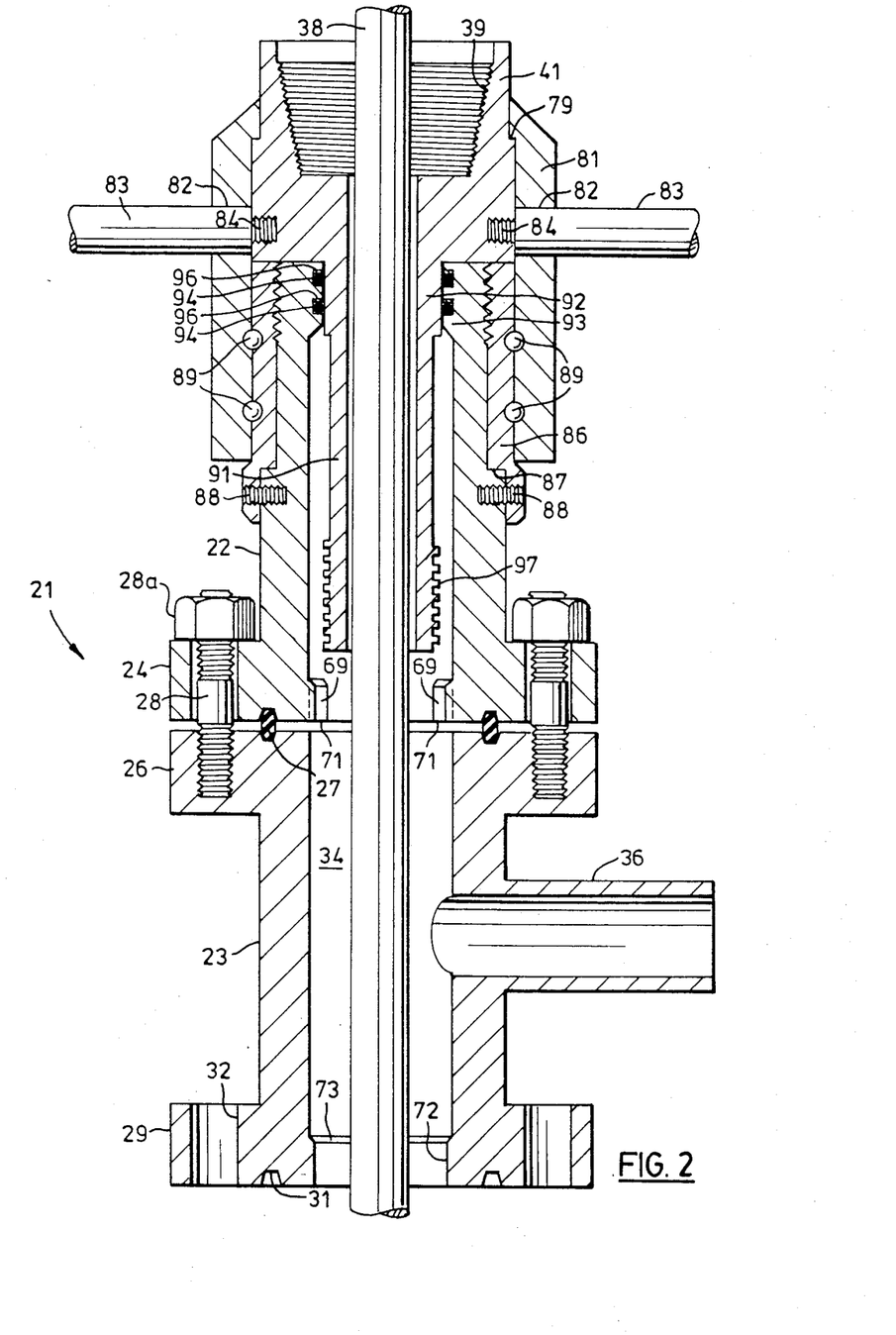
FIG. 2 shows a vertical section, partly in side elevation, through the device, and wherein the internal reciprocating operator member and pack-off member are not shown for greater clarity of illustration.

The lower member 23 defines within it a bore 34 coaxial with and of approximately the same diameter as the opening 18 in the hanger flange 16. The member 23 is in the form of a tee having a flow conduit 36 formed by a branch conduit communicating with the bore 34. Desirably, the lower member 23 and conduit 36 are formed as a unitary body, e.g. as a one-piece casting.

As seen in FIG. 1, connected to the upper end of device 21 is a stuffing box or gland 37, through which passes a polished rod 38. The box 37 provides, in normal service, a gas-tight seal around the rod 38, so that gas can not escape from the upper end of the device 21, while permitting the rod 38 to be reciprocated relative to the device 21. The stuffing box may be of a conventional form well known to those skilled in the art and is threaded into a tapering recess 39 formed in an upper surface of a cylindrical drive member 41 which is connected to the upper end of the member 22. As will be readily appreciated by those skilled in the art, the stuffing box comprises a sealing member disposed in tight sealing contact around the polished rod. This sealing member is of a relatively soft material so that the rod 38 can be reciprocated for prolonged periods without excessive wear of the rod or of the sealing member occurring. Typically, the upper end of the rod 38 is connected to a cross member 42 suspended from cables 43 connected to a prime mover, e.g. through a walking beam. The lower end of the rod 38 has connected to it a sucker rod string which hangs down the well and is connected at its lower end to a down hole pump for pumping fluid up the tubing 19.

Shown somewhat schematically in FIG. 1 are piping arrangements for supplying steam to and for recovering flowable product from the well. The piping comprises a pipe 44 connected to flow conduit 36, usually by welding, and through a two-position steam on-off valve 46 to a tee 47. One arm of the tee 47 connects to a choke 48 for regulating flow of liquid heavy hydrocarbon therethrough. The choke is connected to a four way connector 49, another connection of which is connected to a pipe 51 through which steam may be supplied and through which liquid heavy hydrocarbon may be withdrawn. Another arm of the connector 49 connects through a two-position on-off valve 52 to the tee 47. A fourth connection of the connector 49 is through a pipe 53 and a two-position steam on-off valve 54 to a side conduit 56 communicating with the interior of the bowl 12 forming the head of the well casing 11.

Before describing further the structure and function of the device 21, it is in order to describe a typical sequence of operations employed in the steam injection of and hydrocarbon recovery from the well as employed, for example, in hydrocarbon production from heavy hydrocarbon formations such as tar sands. Normally, a cycle of operations is employed. A first stage of the cycle may typically consist of trickle steaming for about 24 hours wherein valves 46 and 52 are open, valve 54 is closed and choke 48 is closed and steam at, e.g., approximately 450° F. is injected through pipe 44 and down the production tubing 19, at a relatively low flow rate. One purpose of this is to soften and loosen any deposits of cooled and hardened heavy hydrocarbon that may be adhering to the inside of the production tubing 19, so that any such deposits are not likely to plug or block the production tubing during the subsequent flow-back and pumping stages. Secondly, the trickle steaming gradually heats up and expands the production tubing so as to reduce or avoid the abrupt application to it of mechanical forces or shock as a result of sudden differential expansion between the tubing 19 and casing 11. After the trickle steaming, the valves 46 and 52 are closed and valve 54 is opened and steam injection is commenced by introducing high temperature high pressure steam at high flow rates through pipes 51 and 53, to the side conduit 56 and hence down the annulus between the casing 11 and the tubing 19. The annulus is of a relatively large cross-section and thus steam can be passed down it at high flow rates. The high temperature steaming, e.g. at temperatures of about 650° F., may be continued for a prolonged period, e.g. for about 20 days. The function of this steaming is to penetrate the underground formations and to raise the temperature of the underground deposits, thus bringing them to a temperature at which their hydrocarbon content is rendered sufficiently liquid to flow up the production tubing. After steam injection, the valve 54 will typically be closed and the well is closed off and allowed to soak for a prolonged period, e.g. about one month. The purpose of this is to allow time for penetration of the formations to the greatest extent, and it is found that the utilization of a soaking period in many cases increases the efficiency of the hydrocarbon production.

After the soaking period, the valve 46 and the choke 48 are opened, and the hot liquid hydrocarbon is allowed to flow up the production tubing 19 under the pressure built up in the underground formation during the steam injection period. The flow rate of the produced hydrocarbon through the conduit 36 and pipe 44 is limited and controlled by the setting of the choke 48, and the produced liquid is recovered along the pipe 51. Typically, the period of flow-back will continue for from several days to about 1 month.

Once flow-back of liquid has ceased due to depletion of the underground pressure, pumping is commenced. The prime mover is operated to reciprocate the polished rod 38 through the stuffing box 37 and hence reciprocate the sucker rod string connected to the polished rod and actuate the down hole pump, so that liquid hydrocarbon in the formation is pumped up the tubing 19 and recovered through the conduit 36, and pipes 44 and 51 as before. Typically, pumping will continue for several months, e.g. 3 to 4 months, until the liquid hydrocarbon is exhausted or its production rate drops to a point where continued production is no longer practicable. The cycle is then recommenced starting, for example, with trickle steaming.

In the case in which the well is provided with a polished rod and stuffing box, exposure of the material of the sealing member of the stuffing box to high temperature steam, hot vapours and hot liquid hydrocarbon tends to promote relatively rapid wear and deterioration of the seal so that there is risk of loss of the seal around the polished rod, leading to risk of loss of steam or the like, and possible blow out in the event that the underground formation is highly pressurized, whether as a result of the steam injection or through other causes. In many cases, the pipes connected to the flow conduit 36 are vulnerable to damage as a result of their extending in relatively exposed positions above ground adjacent the well head, so that they are prone to breakage or perforation. Further, during steam injection down the annulus, considerable pressure builds up in the production tubing 19, in the flow conduit 36 and in the pipes connected thereto. There is risk that small leakages in any of the control valves, e.g. the valve 46, connected thereto, can result in an escape of high temperature high pressure steam. At high temperatures, pressures, and flow rates, steam has the ability to cut through metal, so that small escapes of steam can escalate into destruction or "wash-out" of the valve, leading to major losses. The liquid hydrocarbon often contains abrasive mineral particles, especially in the case of steam injection of tar sands, and therefore any minute perforations in the pipes or valves connected to the flow conduit 36 are prone to be reamed out by abrasive action of the hot liquid particulate mixture escaping therethrough, thus aggravating any leakage problem.

The device, as shown in the accompanying drawings, provides means for rapidly packing-off the interior of the housing in the event of a failure of the stuffing box during pumping or at any other time, for packing-off the space above the flow conduit 36 during trickle steam injection down the production tubing or during flow back, and the space below the flow conduit 36 during steam injection down the annulus or in the event of loss of sealing of the pipes or valves connected to the flow conduit 36 at any time.

Figure 3:
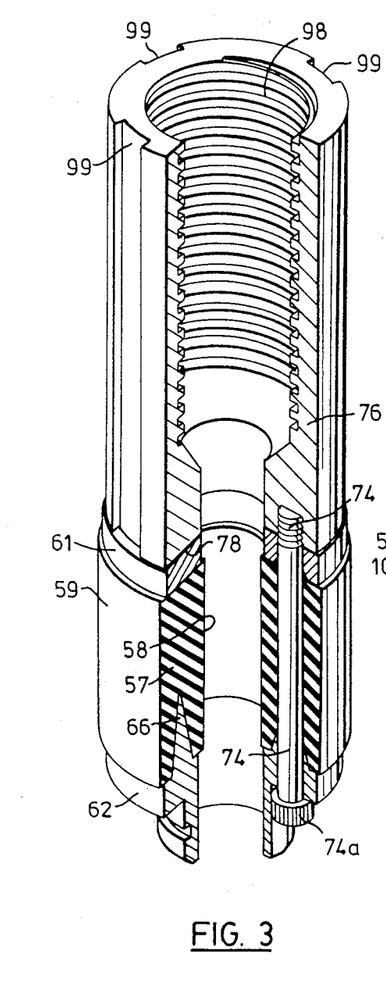
FIG. 3 is a fragmentary perspective view of the operator member and pack-off member of the device.
Figure 3A:
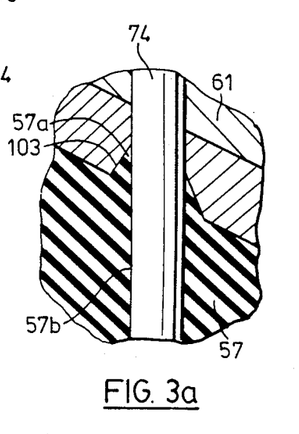
Figure 4:
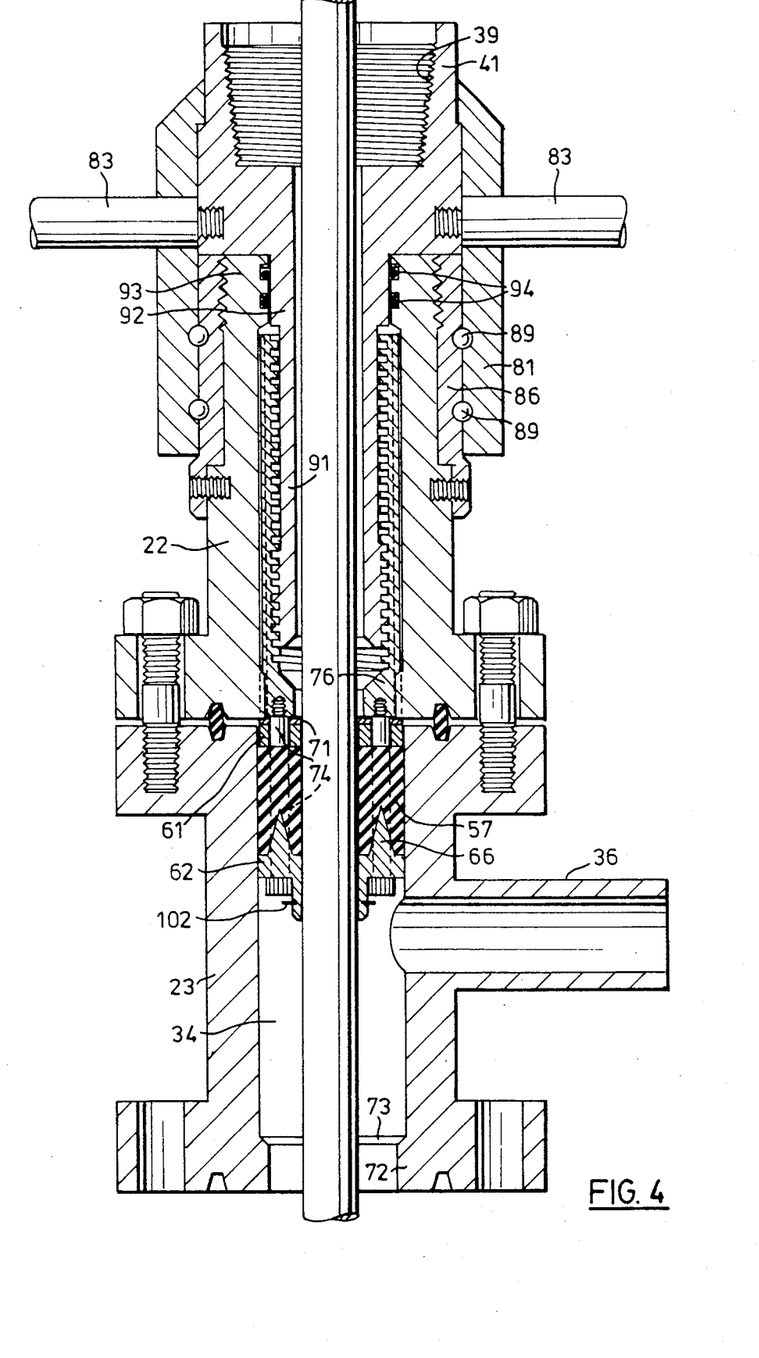
FIG. 4 shows the device in section packed off at an upper position.
Figure 5:
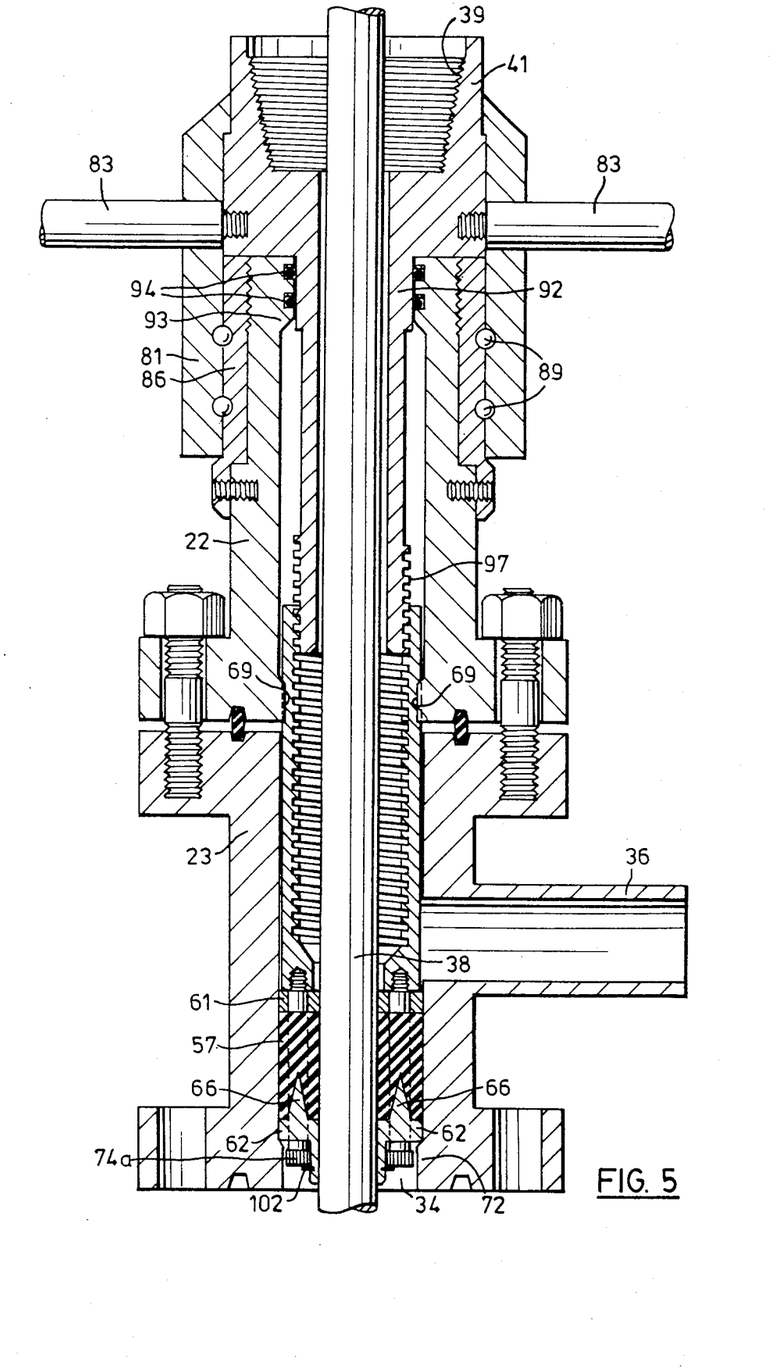
FIG. 5 shows the device packed off at a lower position.

As seen in FIGS. 3, 4 and 5, the vapour shut-off device includes a pack-off member which is disposed in the bore 34 and comprises a heat-resistant resiliently deformable sealing element 57 of annular cross-section. The element 57 has a middle opening 58 of circular cross-section through which the cylindrical polished rod 38 is received. The cylindrical periphery 59 of the element 57 conforms to the cylindrical interior of the bore 34. Normally, there is a small clearance between the periphery 59 of the element 57 and the interior of the bore 34, and between the opening 58 and the exterior of the rod 38, so that the rod 38 and element 57 may be reciprocated relative to one another, and so that the element 57 may be reciprocated within the bore 34.

Figure 6:
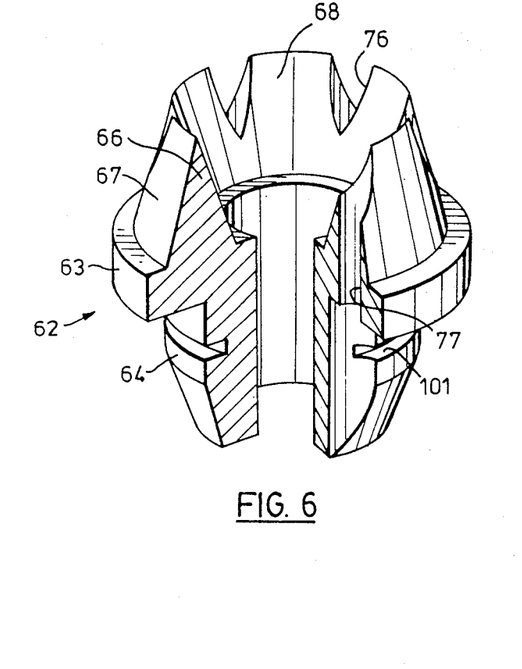
FIG. 6 is a fragmentary perspective view of the rigid expander element of the pack-off member of FIG. 3.

A rigid, e.g. steel, annular upper face plate 61 is disposed on the upper side of the element 57. A generally annular rigid lower face plate 62 shown in more detail in FIG. 6 is disposed on the lower side of the element 57. As seen in FIG. 6, the plate 62 comprises a generally annular portion 63. Integral with this and depending downwardly therefrom is a cylindrical portion 64, and on the upper side is formed integrally therewith a rigid expansion collar 66, which tapers upwardly from the upper surface of the plate 63. As seen in FIG. 6, the collar 66 is generally annular, so that it can expand the sealing element 57 approximately uniformly around its entire circumference. In the preferred form, as shown, the collar 66 is formed by intersecting surfaces 67 and 68, each of which is a frustum of a cone, the cones being equi-angular, and one being inverted with respect to the other, and each being coaxial with the sealing element 57.

As seen in FIGS. 3, 4 and 5, the tapering expansion member 66 is received in a corresponding tapering annular recess in the lower side of the expansion element 57.

Desirably, the interior diameter of the upper tubular member 22 is slightly less than the diameter of the bore 34 of the lower member 23, and, as seen in FIG. 2, the member 22 is formed adjacent its lower end with a series, for example three inwardly projecting splines or castellations 69 which are regularly spaced around the interior of the bore 34. The lower edges of the castellations 69 and of the upper member 22 thus provide a shoulder 71 extending laterally inwardly of the bore 34 at a relatively upper portion thereof.

Adjacent its lower end, the lower tubular member 23 is formed with a constricted portion 72, thus likewise forming on its upper edge a shoulder 73 extending laterally inwardly of the bore 34 adjacent a relatively lower portion thereof.

The sealing element 57 together with the upper and lower plates 61 and 62 are supported so as to be reciprocable between the upper and lower shoulders 71 and 73. For this purpose, the sealing element 57, and face plates 61 and 62 are penetrated by a series of vertically extending bores, through which are passed a corresponding number of bars, for example in the form of bolts 74. The upper ends of these bolts 74 are threaded into corresponding threaded recesses in the lower surface of a hollow cylindrical stem 76. In the preferred form, there are six of these bolts 74 arranged at uniform spacings around the annulus of the sealing element 57. As best seen in FIG. 6, the cylindrical bores 77 through the lower plate member 62 pass vertically through the circle which is the apex of intersection between the conical surfaces 67 and 68 of the expansion member 66. The bores through the element 57 and the upper and lower face plates 61 and 62 are slightly oversized in comparison to the diameter of the bolts 74, so that there is some freedom of sliding movement between the element 57 and the plates 61 and 62 on the one hand and the bolts 74 on the other.

The bolts 74 have enlarged heads 74a which retain the assembly of the lower face plate 62, the element 57 and the upper plate 61 normally in tight contact with a lower annular face 78 of the cylindrical stem 76, without, however, the sealing element 57 being under compression such as to significantly deform it from its as-manufactured cylindrical condition.

The assembly of the bolts 74 together with the cylindrical stem 76 form an operator member which is slidable vertically relative to the assembly of the sealing element 57 and face plates 61 and 62, which together form a pack-off member.

The drive member 41 cooperates with the operator members 74 and 76 to reciprocate the operator member vertically within the bore, and for this purpose the drive member 41 is supported so as to be rotatable relative to the upper tubular member 22 and is threadedly connected to the cylindrical stem 76. As best seen in FIG. 2, the member 41 is formed with an annular step 79 which engages a similarly-formed inner step on the inner surface of a generally cylindrical outer race member 81. The member 81 has a pair of opposing laterally extending bores 82 through it, through which pass a pair of elongated rod-like handles 83 each having a threaded extension 84 on its inner end which engages in a threaded blind bore in the drive member 41, thus locking the member 41 to the race member 81.

Secured on the outer side of the upper end of the upper tubular member 22 is a cylindrical inner race member 86. The upper portion of the inner side of the member 86 is threaded on a corresponding threaded formation on the outer side of the upper end of the tubular member 22. The member 86 is further located by being formed with an internal annular lower step 87, seating on a corresponding step on the outer side of member 22, and by a set screw 88 passing through a threaded bore in the member 86 into a hole in the member 22.

Upper and lower cooperating endless ball grooves are formed in the inner surface of the outer race member 81 and in the outer surface of the inner race member 86, and in these endless grooves, balls 89 are disposed, having been introduced through ports (not shown) extending from the outer side of the race member to the grooves, which ports are subsequently closed with plugs (not shown) threaded therein. The surfaces of the race members 81 and 86 may be hardened, e.g. by carburizing or the like, so as to provide wear-resistant surfaces permitting free rotation with reduced wear between the inner and outer race members 81 and 86. As will be appreciated, the balls 89 also provide a thrust resistant bearing whereby any axial or vertical thrust forces applied to the drive member 41 are transmitted through the race members 81 and 86 and balls 89 to the upper tubular member 22.

The drive member 41 has a downward cylindrical extension 91 formed with an upper portion 92 of enlarged diameter, which in the assembled condition shown in FIG. 2 is disposed within a relatively constricted upper portion 93 of the tubular member 22. Upper and lower square section grooves are formed in the inner surface of the constricted portion 93 and disposed in each of these grooves is a resilient high temperature-resistant elastomeric O-ring 94 which forms a liquid and gas-tight seal between the portions 92 and 93. A resilient metal split ring 96 is snapped into the upper side of each of the square section grooves and each ring 96 is expanded resiliently by the enlarged diameter portion 92 and is therefore tightly engaged around the portion 92. The rings 96 serve to reduce the tendency for the material of the O-rings to be extruded upwardly, resulting in failure of the seal. The lower portion of the extension 91 is formed with a screw thread 97 of diameter such that, when the device is being assembled, they can be passed freely through the opening defined by the portion 93. As best seen in FIG. 3, the inner side of the hollow cylindrical stem 76 is formed with a mating screw thread 98. Desirably, the threads 97 and 98 are Acme screw threads. The outer side of the stem 76 is formed with longitudinally extending square section grooves 99 corresponding in spacing and position to the castellations 69 on the lower portion of the inner side of the tubular member 22 and dimensioned so that there is clearance between the castellations 69 and grooves 99 sufficient to permit free vertical sliding of the stem 76 relative to the member 22, so that the castellations serve as splines cooperating with the grooves 99 and preventing rotation of the stem 76 relative to the member 22.

In assembling the device 21, the hollow stem 76 having the face plates 61 and 62, element 57 and bolts 74 secured thereto, is introduced in to the lower end of the tubular member 22 before the latter is bolted to the upper flange 26 of the lower member 23. The thread 97 is engaged with the internal thread 98 in the stem 76 and rotated, so that a few turns of the threads are interengaged. Subsequently, the lower member 23 is bolted on, as seen, for example in FIGS. 4 and 5.

In use, the resilient element 57, together with the upper and lower face plates 61 and 62 can be reciprocated between upper and lower positions shown in FIGS. 4 an 5, respectively, by rotating the drive member 41 by grasping the handles 83 and pulling on one handle while simultaneously pushing on the other in order to twist the drive member 41 about its vertical axis. The rotation of the threads 97 on the lower extension 91 of the drive member 41 is effective to drive the hollow stem 76 vertically up or down since the stem 76 is retained against rotation by the splines or castellations 69 engaging in the grooves 99 in the outer side of the stem. Desirably the threads 97 and 98 are lefthanded threads so that rotation of the drive member clockwise tends to drive the sealing element 57 downwards to the position shown in FIG. 5, while counter-clockwise rotation drives the element 57 upwards to the position shown in FIG. 4. The reciprocal movement of the stem 76 together with the sealing element 57, etc., relative to the threaded extension 91 is limited in the upper position, as shown in FIG. 4, by engagement of the upper face plate 61 against the upper shoulders 71 and in the lower position as shown in FIG. 5 by engagement of the lower face plate 62 against the lower shoulder 73, i.e. the grooves 99 run out through the upper face of the stem and do not limit downward movement of the stem 76, and the upper face plate 61 engages the upper shoulders 71 before the threaded extension 91 reaches the end of the thread 98 in the bore in the hollow stem 76 and before the upper end of the stem 76 engages on the upper portion 92 of the extension 91 or on the constricted upper portion of the member 22.

In the upper position as shown in FIG. 4, when counter-clockwise torque is applied to the handles 83 by hand pressure, the bolts 74, their heads 74a and the lower face plate 62 engaged thereby, are urged upwardly relative to the upper face plate 61 engaged on the shoulder 71 so that the resilient element 57 is compressively deformed longitudinally and tends to expand laterally. The plate 61 is thereby displaced slightly downwardly away from its normal position abutting the lower side of the stem 76. Simultaneously, the tapering expansion collar 66 reacts with the side walls of the cavity within which it is received in the element 57 so as to tend to deform the adjacent portions of the element 57 outwardly toward the inner side of the bore 34 and inwardly toward the outer surface of the rod 38, thus forming a tightly-compressed pack-off in which the resilient material of the element 57 is tightly engaged with the bore 34 and with the rod 38. Similarly, in the lower position shown in FIG. 5, clockwise torque applied by hand pressure on the handles 83 results in the lower face of the stem 76 urging the upper plate 61 and the sealing element 57 downwardly relative to the lower plate 62 and the expander member 66, which are retained by the shoulder 73, and the plate 62 being displaced upwardly relative to its normal position in abutment with the upper side of the bolt heads 78, so that a pack-off between the bore 34 and the rod 38 is achieved at this position. Although in each of these pack-off positions the resilient reaction of the element 57 exerts a torque on the stem 76 tending to loosen or release the pack-off, the mechanical advantage of the threaded connection between the stem 76 and the extension 91, the friction between the interengaged screw threads, and the inertia of the drive member 41 and handles 83 prevent loosening rotation of the extension 91.

In the preferred mode of use of the device, in the pumping stage of the cycle of operations described above the sealing element 57 is positioned adjacent but not at the upper pack-off position as shown in FIG. 4 i.e. it is a few turns of the drive member 41 away from the upper pack-off position. In the event of failure of the seal of the stuffing box 37 during the pumping operation and of escape of vapor or liquid under pressure through the stuffing box, a pack-off preventing further escape can be quickly achieved by turning the handles 83 counter-clockwise to raise the element 57 to the upper pack-off position. Importantly, regardless of the sense in which the handles 83 are turned, a pack-off will be achieved in one of the two possible positions, namely upper and lower. In the event of an escape of vapor or liquid through breakage or failure of piping or of a valve connected to the flow conduit 36 during pumping, an operator inadvertently turning the handles 83 counter-clockwise will quickly reach the stop position of the upper pack-off position and will then quickly perceive that the handles need to be turned in the opposite direction to achieve a pack-off in the lower position, thus closing off flow to the flow conduit 36.

During trickle steaming and during flow back up the production tubing 19, the device may be operated to maintain a pack-off in the upper position of FIG. 4, in order to limit exposure of the relatively less durable seal member of the stuffing box 37 to steam and other hot vapors, and to hot and usually abrasive produced liquid hydrocarbons. During steam injection down the annulus and during soaking of the well, the device can be employed to maintain a pack-off in the lower position, as shown in FIG. 5, preventing exposure of the stuffing box seal to hot or abrasive fluids and serving to prevent escapes of gas or liquid in the event of accidental damage, breakage or the like suffered by piping or valves connected to the flow conduit 36.

In the preferred form, the lower cylindrical portion 64 of the lower face plate 62, as seen in FIG. 6, has a circumferential groove 101 and tapers downwardly below the groove 101 to permit a split spring ring 102 to be snapped into the groove, as seen in FIGS. 4 and 5. The ring 102 interferes with the heads of the bolts 74 if these become loosened from their normal position tightly threaded into the base of the stem 76 as a result of vibration, and serve to stop the bolts 74, if loosened, from dropping down the tubing 19. The spacing between the ring 102 and the heads 78 of the bolts 74 in the normal or uncompressed condition of the sealing element 57 is sufficient to avoid the bolt heads 78 engaging the ring 102 when the latter is displaced upwardly in the lower pack-off position shown in FIG. 5.

Preferably, one of the face plates 61 and 62 is formed with a recess, such as the frusto-conical recess 103 tapering away from the inner side of the face plate circumadjacent each point where a bolt 74 passes through the plate 61, and the sealing member 57 is formed with a corresponding generally frusto-conical lip 57a, so that when the element 57 is compressed vertically between the plates 61 and 62 in a pack-off position, the reaction between the tapering recess 103 and the lip 57a converges the material of the lip 57a into tight compression around the bolt 74, so that a tight seal is formed between the element 57 and the bolts 74, closing the bores 57b through which the bolts 74 pass. Such tapering recesses may be formed in the inner sides of either or both of the face plates 61 and 62, adjacent the sealing element 57, and the portions of the element 57 adjacent thereto provided with corresponding lip formations, but, for convenience of machining, are formed in the upper plate 61. The element 57 is preferably a heat-resistant elastomer having sufficient resilience that, on release of the pressure to which the element is subjected during pack-off, it retracts laterally so that adequate clearance is restored between it, the rod 38 and the inner surfaces of the bore 34 to permit reciprocation of the rod 38 and travel of the sealing element between its upper and lower pack-off positions. Suitable heat resistant elastomers are known to those skilled in the art, and are employed in known blow-out preventer devices intended for high temperature service.

Various modifications may be made to the device. For example, the lower side of the upper plate 61 may be formed with a downwardly tapering expander element similar to the expander element 66, received in a corresponding tapering recess in the upper side of the element 57, and the upper side of the lower plate 62 may be planar.

Instead of using a screw thread and spline arrangement for reciprocating the pack-off member constituted by the element 57 and plates 61 and 62 between its upper and lower positions, other arrangements may of course be employed. For example, one or more hydraulic cylinders can be provided within the upper tubular member 22, with pistons connecting downwardly to the bolts 74, and operable by fluid pressure leads passing through the side wall of the member 22. Such arrangements, however, greatly increase the complexity and cost of the device and therefore a hand-operable screw thread is preferred.

In other advantageous forms, the element 57 together with the plates 61 and 62 may be supported to reciprocate between upper and lower shoulders both of which are disposed above the flow conduit 36, and are spaced apart so that the assembly of the element 57 and plates 61 and 62 has only a small degree of freedom of vertical travel, so that regardless of the sense in which the handles 83 are rotated, the assembly is rapidly brought into engagement with one or the other of the two shoulders and a pack-off achieved with great rapidity. In other forms, instead of a reciprocating polished rod 38, a shaft which is normally vertically stationary is passed through the drive member 41 and assembly of plates 61 and 62 and the sealing element 57. Such shaft may be secured to the upper end of the drive member in sealing fashion without requiring a stuffing box or other reciprocation-permitting sealing arrangement, and may for example be a hollow shaft through which thermocouples or the like may be passed in order to monitor the well temperatures at various levels.

The preferred form of the present device as shown in the accompanying drawings has numerous advantages.

Since the means for reciprocating the operator member, namely the drive member and the extension 97 thereof, form a seal with the tubular housing 22 at the O-rings 94, the thrust exerted by pressurized fluid within the bore 34 is transmitted to the thrust-resistant bearing between the housing 22 and the drive member 41, and the pressure within the bore 34 acts equally on the upper and on the lower sides of the assembly of the operator member (stem 76 and bolts 74) and the pack-off member (the element 57 and the plates 61 and 62). This assembly of the operator member and pack-off member is therefore free-floating within the bore 34. This, therefore, greatly facilitates moving the pack-off member in the presence of fluid under pressure in the bore 34 and is not driven vertically in one direction or the other into tight binding engagement with the screw threads 97 of the extension 91 of the drive member 41 and permits the production tubing 19 to be packed-off or, if desired, to be opened, under pressure, by rotation of the drive member 41.

As noted above, the screw-threaded drive for the pack-off member provides a mechanical advantage, thus allowing a tight pack-off of the production tubing by application of hand pressure only. A further advantage of the arrangement shown, wherein the diameter of the threads on the extension of the drive member 41 and on the stem 76 are less than the diameter of the bore 34, is that in the event of solidified hydrocarbon or other solids caking on the threads, it is relatively easy to overcome any tendency of the threads toward sticking by applying hand pressure to the handles 83. For example, the handles 83 may each be about 12 inches long, and merely by way of example, it may be mentioned that the diameter of the screw threads on the stem 76 and drive member 41 may each be about 2½ inches so that a considerable turning moment can be applied to the threads in order to free the movement of the drive member 41 relative to the stem 76.

I claim:

1. A well head shut-off device, comprising:
   (a) a housing adapted to be connected to the upper end of production tubing and having a vertical bore therethrough, a flow conduit communicating with the interior of the bore for collection of liquid flowing into the bore from the production tubing, and a shoulder extending laterally inwardly of the bore at upper and lower portions thereof;
   (b) a pack-off member disposed in the bore and comprising a heat resistant resiliently deformable annular sealing element of which the middle opening extends vertically of the bore and is adapted to receive a cylindrical shaft therethrough, and the periphery conforms to the interior of the bore, a rigid face plate on the upper and lower sides of the sealing element, and a rigid expansion member tapering from adjacent one of said face plates vertically toward the interior of the sealing element and being received in a corresponding cavity therein;
   (c) an operator member slidable vertically relative to said pack-off member and face plates and having upper and lower abutments facing toward the face plates on the upper and lower side of the sealing element, respectively; and
   (d) means for reciprocating said operator member between an upper position engaging the upper face plate on the upper shoulder and compressing the sealing element between the upper face plate and the lower face plate retained on the lower abutment, and a lower position engaging the lower face plate on the lower shoulder and compressing the sealing element between the lower face plate and the upper face plate retained on the upper abutment, whereby in each of said positions the sealing element is compressed vertically and the expansion member is driven vertically into said cavity, thereby expanding the sealing element laterally to form a seal between the bore and the cylindrical shaft when inserted therein.

2. A device as claimed in claim 1 including a stuffing box connected to the upper end of the housing and forming a sliding seal with a polished rod passing through the middle opening of the annular sealing element.

3. A device as claimed in claim 1 wherein the flow conduit connects with a part of said bore intermediate the upper and lower portions having said shoulders.

4. A device as claimed in claim 1 wherein the means for reciprocating the operator member extend between the interior and the exterior of the housing and pass through means forming a seal with the housing, and are connected to the housing by means resisting axial thrust, whereby said operator member and said pack-off member are free floating in the bore.

5. A device as claimed in claim 1 including an annular flange connecting with a lower end of the housing and having a central opening coaxial with the bore and formed with a threaded portion for threaded suspension of a production tubing string therefrom, and a peripheral portion adapted for connection to the upper end of a tubular well casing.

6. A device as claimed in claim 1 wherein the housing comprises upper and lower cylindrical housing members connected together, with said shoulders being formed on said upper and lower members, respectively.

7. A device as claimed in claim 1 wherein said operator member comprises regularly angularly spaced bars passing slidingly through the sealing element and face plates.

8. A device as claimed in claim 1 wherein the operator member comprises a bar passing slidingly through the pack-off member and the face plates, and wherein one of the face plates is formed with a recess tapering away from the inner side of the face plate, circumjacent the point where the operator member passes therethrough and the sealing element includes a lip extending into said recess.

9. A device as claimed in claim 1 wherein the rigid expansion member is disposed adjacent the lower face plate.

10. A device as claimed in claim 1 wherein the rigid expansion member comprises a rigid collar having tapering surfaces defined by mutually inverted inner and outer conical frustums coaxial with the sealing element.

11. A device as claimed in claim 1 wherein the sealing element comprises heat-resistant elastomer.

12. A device as claimed in claim 1 wherein the operator member is mounted non-rotatably within the bore and includes a threaded stem disposed within the housing, and the means for reciprocating comprise a drive member threadedly engaging the stem.

13. A device as claimed in claim 12 wherein the drive member passes from the interior to the exterior of the housing through sealing means forming a seal with the housing, and is mounted to the housing by a thrust-resistant bearing.

14. A device as claimed in claim 13 wherein the thrust-resistant bearing comprises roller members received in races in said drive member and housing, respectively.

15. A device as claimed in claim 12 wherein the diameters of the threads on said stem and drive member are less than the diameter of the bore.

16. A device as claimed in claim 15 wherein the drive member is provided with handles extending laterally outwardly.

17. A device as claimed in claim 12 wherein the drive member is disposed at the upper end of the housing and has a downward cylindrical extension threadedly engaging said stem, the latter extending upwardly from the operator member, one of said stem and extension being hollow and the other being received therein.

18. A device as claimed in claim 17 wherein the stem is hollow and the cylindrical extension is received therein.

* * * * *